United States Patent [19]

Pielach et al.

[11] Patent Number: 4,763,515
[45] Date of Patent: Aug. 16, 1988

[54] TIRE UNIFORMITY MACHINE AND METHOD

[75] Inventors: Martin Pielach, Mt. Clemens; Seymour A. Lippman, Huntington Woods, both of Mich.

[73] Assignee: The Uniroyal Goodrich Tire Company, Akron, Ohio

[21] Appl. No.: 12,915

[22] Filed: Jan. 14, 1987

[51] Int. Cl.$^4$ .......................................... G01M 17/02
[52] U.S. Cl. ....................................... 73/146; 157/16
[58] Field of Search ..................... 73/146; 157/14, 16

[56] References Cited

U.S. PATENT DOCUMENTS

| | | | |
|---|---|---|---|
| 3,552,200 | 1/1971 | Hermanns et al. | 73/146 |
| 3,656,343 | 4/1972 | Braden et al. | 73/146 |
| 3,698,233 | 10/1972 | Braden et al. | 73/146 |
| 3,987,672 | 10/1976 | Loyer | 73/146 |
| 4,004,693 | 1/1977 | Tsuji et al. | 73/146 |
| 4,078,339 | 3/1978 | Ongaro | 73/146 |
| 4,225,238 | 9/1980 | Rottenkolber | 73/146 |
| 4,574,628 | 3/1986 | Maikuma et al. | 73/146 |

Primary Examiner—Donald O. Woodiel
Attorney, Agent, or Firm—Alan A. Csontos; Michael J. Colitz; John D. Haney

[57] ABSTRACT

A machine for testing the uniformity of tires. The machine comprises: a test spindle configured to receive a rim supporting a tire; an index table having a pair of index spindles; indexing means to rotate the index table whereby the index spindles may move a tire between an operator loading station and an index station; a loader robot adapted to move between the test spindle and the index station for transporting therebetween a tire; a roadwheel movable between a retracted position out of contact with a tire and an advanced position in driving contact with a test tire; motor means to rotate the roadwheel while in its advanced position; and transducer means coupled to the test spindle to determine vibrations of the test tire when rotated by the roadwheel as caused by non-uniformities within the tire. Also disclosed is a method for testing tires as with the disclosed machine.

20 Claims, 7 Drawing Sheets

TIRE UNIFORMITY MACHINE AND METHOD

BACKGROUND OF THE INVENTION

1. Field of the Invention

This invention relates to testing tires for uniformity and, more particularly, to a method and apparatus for automatically feeding tires to a test spindle and there testing them for uniformity.

2. Description of the Prior Art

As manufactured, tires are not always uniform in their distribution of materials throughout their masses. Tires with a lesser degree of uniformity will induce greater vibrational and acoustical disturbances into the vehicles on which they are utilized. Conversely, tires with a greater degree of uniformity will induce lesser or no disturbances into the vehicle on which they are utilized and thus provide a superior ride. Tires manufactured with an unacceptable degree of non-uniformity may be reworked as through buffing or grinding or the like prior to sale and use. In any event, the manufacturer must continuously remain cognizant of the quality of his manufactured tires, always trying to improve them, in order to maintain the quality of his products in the market place and retain a competitive edge.

Manufactured tires are normally tested on machines to determine their uniformity. Efforts are continuously being made to improve tire uniformity machines which may more accurately and conveniently test and grade tires to determine their degree of uniformity or non-uniformity. The most common type of tire uniformity machine in commercial use today requires the manual placement of a tire, supported on a rim, onto a rotatable spindle. An adjacent roadwheel is rotated in contact with the test tire at speeds and loads representative of those which occur on automobiles in service. During testing, vibrations caused by non-uniformities or irregularities in any test tire are induced into the roadwheel. A transducer coupled with the roadwheel may sense and record the vibrations of the roadwheel. Such roadwheel vibrations represent tire nonnon-uniformity since vibrations of the roadwheel correspond with vibrations of the tire.

Uniformity machines may be rendered more efficient by several techniques. First, the coupling of the transducer to a test spindle rather than to the roadwheel will preclude the enormous inertia of the roadwheel from dampening out much of the vibrations intended to be measured. Second, the placement of the test tire with its supporting rim onto the test spindle has been found to be more accurate and less conducive to error when done automatically rather than when such placement is done manually by an operators Third, the use of specially designed precision rims and spindles at the test station can reduce or eliminate extraneous vibrational signals normally caused by conventional rims and spindles. Reducing or eliminating such extraneous vibrational signals results in the transducer sensing only those signals caused by tire non-uniformity for more accurate grading of tires as intended.

In this last regard, the prior art discloses many types of rims and spindles as well as a wide variety of techniques for coupling such rims to spindles for various purposes. A common purpose for such coupling is so that the manufactured tire might be trimmed, buffed, trued or the like for rendering the tire more uniform in its shape. Note, for example, U.S. Pat. Nos. 2,321,936 to Pollock; 2,759,508 to Tobey; 2,868,291 to McMahan; 2,918,116 to Mooney; and 3,556,194 to Farrington. Similarly, such coupling techniques might be utilized for supporting a tire for rotation during a recapping or retreading operation. Note for example, U.S. Pat. Nos. 2,116,512 to Ericson, et al and 3,614,969 to Breiner. The prior art discloses many other additional techniques and devices for supporting a rim on a spindle for various other purposes. Such purposes include tire building, tire changing, tire balancing, tread building, or the like. Note for example, U.S. Pat. Nos. 2,000,036 to Renfro; 2,081,402 to Krema; 2,270,657 to Kraft; 2,334,606 to Castiglia; 2,481,926 to Henderson; 2,603,267 to Simpson; 2,973,791 to French; 3,219,078 to Wright; and 3,238,982 to Darr. Lastly, the prior art also disloses devices for supporting a pneumatic tire on a spindle through a rim wherein the device includes apparatus for automatically inflating the tire. Note, for example, U.S. Pat. Nos. 2,960,130 to Smyser and 3,291,171 to Lehmann.

None of these prior art patents or commercial devices teach or suggest the efficient, accurate, convenient, and economical machine and method as described herein. Known methods and apparatus for testing the uniformity of tires are simply lacking in one regard or another.

As illustrated by the great number of prior patents and commercial devices, efforts are continuously being made in an attempt to more readily test tires for uniformity. None of these prior art efforts, however, suggests the present inventive combination of method steps and component elements arranged and configured for testing the uniformity of tires as disclosed and claimed herein. Prior methods and apparatus do not provide the benefits attendant with the method and apparatus of the present invention. The present invention achieves its intended purposes, objectives and advantages over the prior art devices through a new, useful and unobvious combination of method steps and component elements, through the use of a minimum number of functioning parts, at a reduction in cost to manufacture and operate, and through the utilization of only readily available materials and conventional components.

These objects and advantages should be construced as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary and detailed description of the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into a machine for testing the uniformity of test tires. The machine comprises in combination: (1) a test spindle rotatable about its axis and configured to receive a rim supporting a test tire; (2) an index table rotatable about an axis parallel with, but offset from, the axis of the test spindle, the index table having a pair of spaced, upwardly extending index spindles; (3) indexing means to rotate the index table about its axis whereby the index spindles may move between an operator loading station remote from the test spindle to an index station in proximity to the test spindle; (4) a loader robot adapted to move between a first position at the test spindle and a second position at the index spindle at the index station for transporting therebetween a rim supporting a test tire; (5) a roadwheel rotatable about an axis parallel with, but offset from, the axis of the test spindle, means to move the roadwheel between a retracted position out of contact with a test tire supported by the test spindle and an advanced position wherein the roadwheel is in driving contact with the test tire supported by the test spindle; (6) motor means to rotate the roadwheel while in its advanced position; and (7) transducer means coupled to the test spindle to determine vibrations of the test tire when rotated by the roadwheel as caused by non-uniformities within the test tire.

The index table is circular and the index spindles are located adjacent to its periphery at diametrically opposed locations. The axes of the test spindle, index table and roadwheel are all parallel with, but offset from, one another and located within a common plane and with the axis of the test spindle located between the axes of the index table and the roadwheel. The loader robot includes gripper means to grip a rim supporting a test tire. The loader robot is adapted to move vertically between a lower position whereat the gripper means may grip and release a rim supporting a test tire and a higher position whereat the gripper means may horizontally transport a gripped rim supporting a test tire. The machine further includes inflation means to inflate a test tire supported by a rim on the index spindle at the operator loading station. The test spindle includes locking means to lock and unlock thereon a rim supporting a test tire. The machine further includes means on the loader robot to activate and inactivate the locking means.

The invention may further be incorporated in apparatus for feeding a test tire mounted on a rim to and from a test station. The apparatus comprises in combination: (1) an indexing assembly including a pair of spaced, upwardly extending index spindles adapted to move between an operator loading station and an index station; (2) a loader robot assembly adapted to move between a position at the test station and a position adjacent to the index spindle at the index station for transporting therebetween a test tire mounted on a rim; (3) a roadwheel assembly having a roadwheel rotatable about its axis, means to move the roadwheel between a retracted position out of contact with a test tire at the test station and an advance position wherein the roadwheel is in driving contact with a test tire at the test station; (4) motor means to rotate the roadwheel while in its advanced position; and (5) transducer means operatively coupled with the test station to determine vibrations of the test tire when rotated by the roadwheel as caused by non-uniformities within the test tire.

The indexing assembly includes a circular table rotatable about its axis. The index spindles are located adjacent to the periphery of the table at diametrically opposed locations. The loader robot assembly includes includes gripper means to grip and release a rim supporting a test tire. The loader robot assembly is adapted to move the gripper means vertically between a lower position whereat the gripper means may grip and release a rim supporting a test tire and a higher position whereat the gripper means may horizontally transport a gripped rim supporting a test tire. The apparatus further includes an inflator assembly to inflate a test tire supported by a rim on the index spindle at the operator loading station. The apparatus further includes locking means associated with the test station to lock thereon and unlock a rim supporting a test tire. The apparatus further includes means on the loader robot assembly to activate and inactivate the locking means.

In addition, the invention may further be incorporated in a method for testing the uniformity of test tires. The method comprises in the steps of: (1) providing a test spindle rotatable about its axis and configured to receive a rim supporting a test tire; (2) providing an index table rotatable about an axis parallel with, but offset from, the axis of the test spindle, the index table having a pair of spaced, upwardly extending index spindles; (3) providing an indexing means to rotate the index table whereby the index spindles may move from an operator loading station remote from the test spindle to an indexing station in proximity to the test spindle; (4) moving a rim supporting a test tire from the index spindle at the index station to the test spindle; (5) providing a roadwheel rotatable about an axis parallel with, but offset from, the axis of the test spindle; (6) moving the roadwheel from a retracted position out of contact with a test tire on the test spindle to an advance position wherein the roadwheel is in driving contact with a test tire on the test spindle; (7) rotating the roadwheel while in its advanced position to rotate the rim and its supported test tire; and (8) sensing the vibrations of the test tire when rotated by the roadwheel.

The index table is circular and the index spindles are located adjacent to its periphery at diametrically opposed locations. The method further includes the step of rotating the index table to move a rim supporting a test tire on the index spindle at the operator loading station to the indexing station. The invention further includes gripper means to grip a rim supporting a test tire. The above-mentioned step of moving a rim includes the steps of moving the gripper means vertically to a lower position at the indexing station whereat the gripper means may grip a rim supporting a test tire, moving the gripper means vertically to a higher position, moving a rim supporting a test tire horizontally, moving the gripper means vertically to a lower position at the test station whereat the gripper means may release a rim supporting a test tire. The method further includes the step of inflating a test tire supported by a rim on the index spindle at the operator loading station. The test spindle includes locking means to lock thereon a rim supporting a test tire and further including means to activate and inactivate the locking means. Further included is the step of locking the rim supporting a test tire on the test spindle prior to testing.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other methods and apparatus for carrying out the same purposes of the present invention. It should also be realized by those skilled in the art that such equivalent methods and apparatus do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which.

Similar reference numerals refer to similar parts throughout the several Figures.

DETAILED DESCRIPTION OF THE INVENTION

Figure 1:
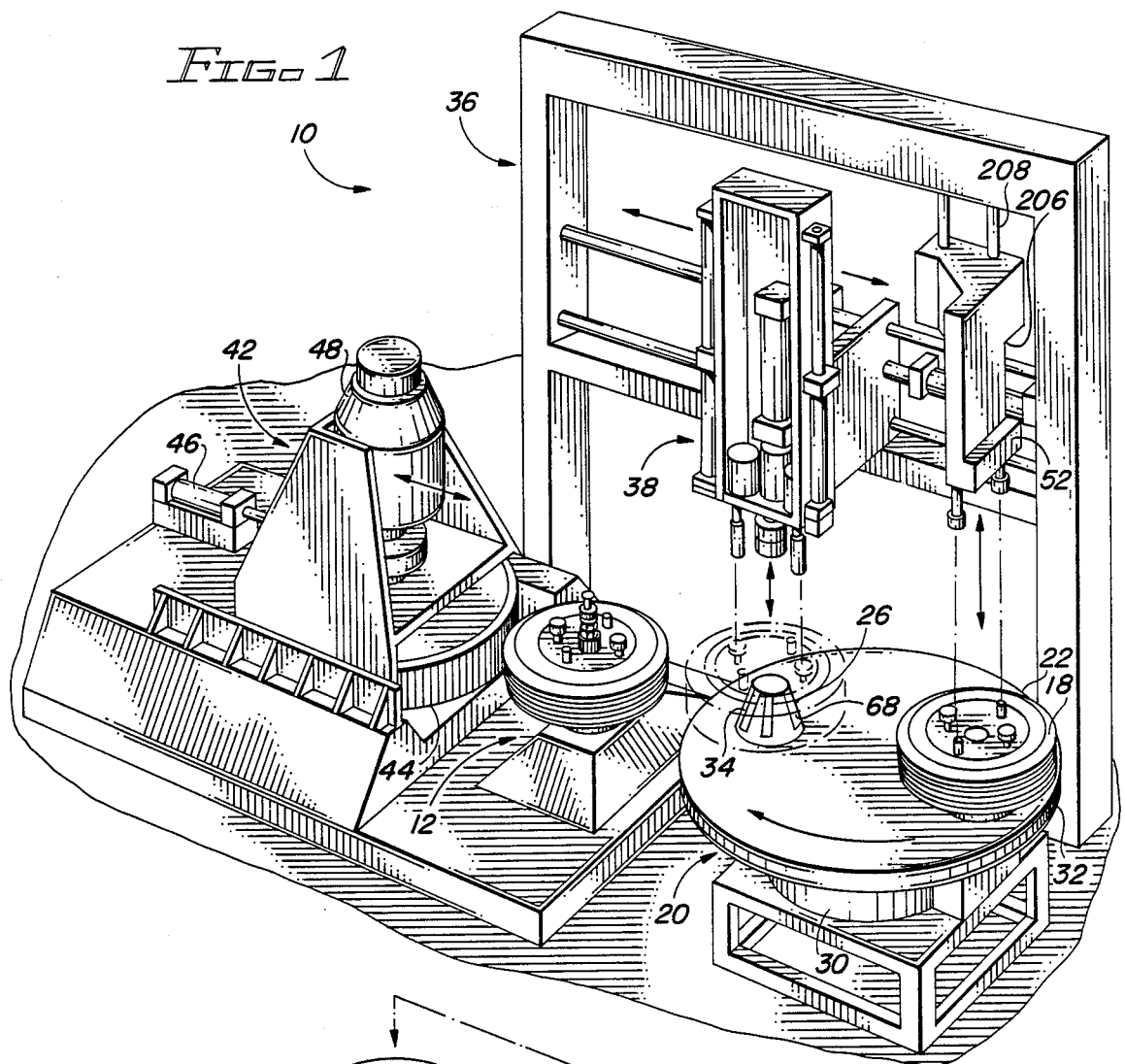
FIG. 1 is a perspective illustration of a tire uniformity machine constructed in accordance with the principles of the present invention.

The tire uniformity machine 10, as particularly seen in FIG. 1, is comprised of a plurality of assemblies which function together in the feeding and testing of tires. The first assembly is the spindle assembly 12 with a test spindle 14 rotatable about its axis and configured to receive a rim assembly 16 supporting a test tire 18. An index assembly 20 includes an index table 22 rotatable about an axis parallel with, but offset from, the axis of the test spindle 14. The index table 22 has a pair of spaced, upwardly extending index spindles 24 and 26. Indexing means 30 are provided to rotate the index table 22 about its axis whereby the index spindles 24 and 26 may move between an operator loading station 32 remote from the test spindle to an index station 34 in proximity to the test spindle 14. A loader robot assembly 36, includes a tire loader and power wrench subassembly 38 adapted to move between a first position at the test spindle 14 and a second position at the index spindle at the index station 34 for moving therebetween a rim assembly 16 supporting a test tire 18. A roadwheel assembly 42 includes a roadwheel 44 rotatable about an axis parallel with, but offset from, the axis of the test spindle 14. The axes of the roadwheel, spindle assembly and index spindle at the index station are parallel with each other but lie in a common plane with the test spindle assembly axis located between the other two axes. Hydraulic cylinder means 46 are provided to move the roadwheel 44 between a retracted position out of contact with a test tire supported by the test spindle and an advanced position wherein the roadwheel is in driving contact with a test tire supported by the test spindle. Motor means 48 rotate the roadwheel while in its advanced position. A transducer 50 is coupled to the test spindle to determine vibrations of the test tire when rotated by the roadwheel as caused by non-uniformities within the test tire. Lastly, an inflator assembly 52 is located above the operator loading station 32 for inflating a test tire with air prior to feeding and testing.

Figure 5:
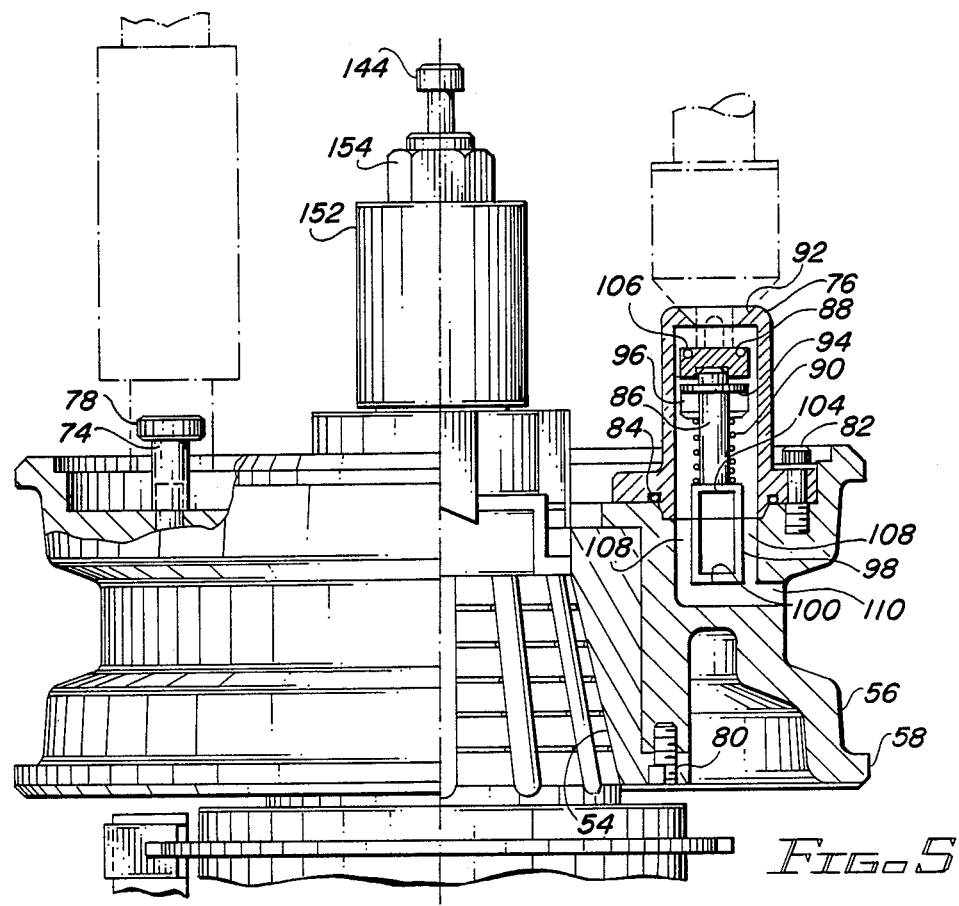
FIG. 5 is a front elevational view of the test spindle assembly with the rim assembly partially in cross section.
Figures 2D, 2E:
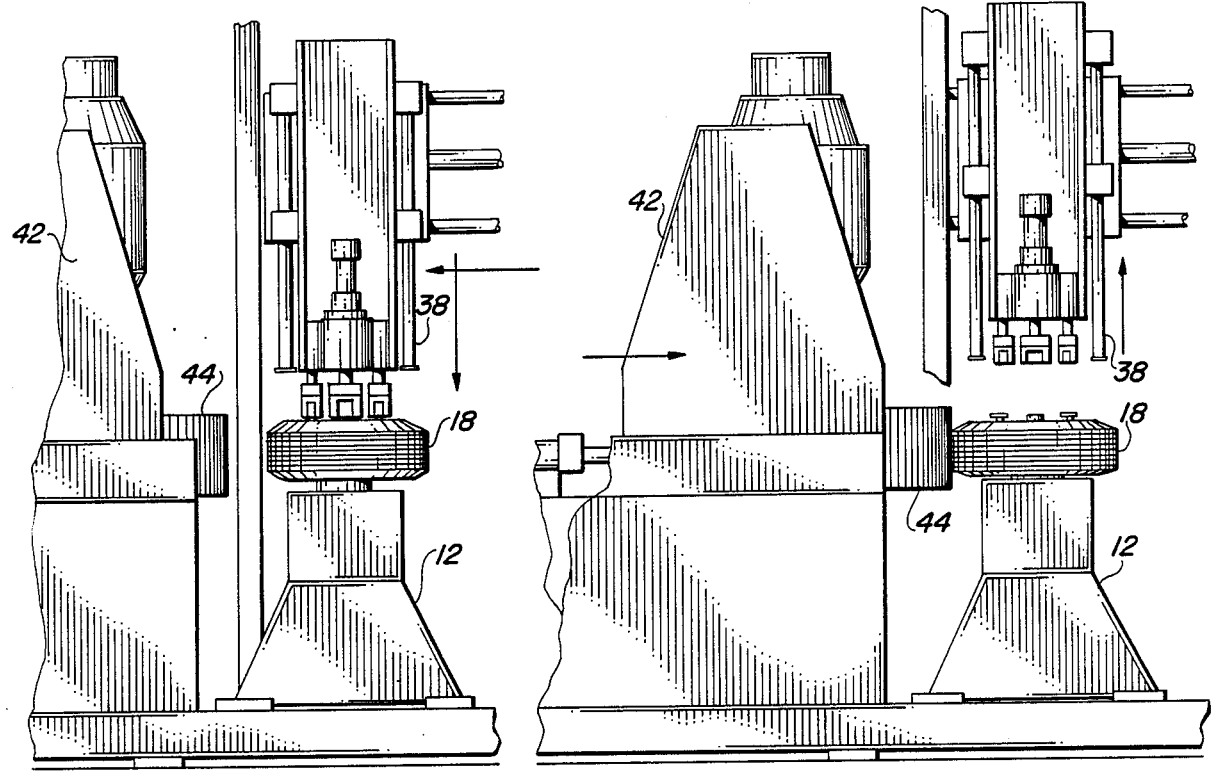
FIG. 2d is a partial front elevational view of the tire loader and power wrench subassembly shown in FIG. 2a but having lowered a tire with its supporting rim onto the test spindle assembly.
FIG. 2e is a partial front elevational view similar to that shown in FIG. 2d but with the tire loader and power wrench subassembly raised and the roadwheel in its advanced position.

The machine employs a specially designed precision rim assembly 16 for supporting the tire to be tested. Note, in particular FIGS. 5, 6a and 6b. The rim assembly is generally cylindrical in configuration and is formed of a taper sleeve 54 at its radial interior and a rim 56 as its radial exterior. A plurality of similar rim assemblies are preferably utilized in association with each machine. In this manner, while the machine is testing a tire, an operator may dismount a previously tested tire from its rim assembly and may also mount an additional tire on an additional rim asssembly for testing.

The rim 56 is generally cylindrical with a central axis coextensive with the axis of the tire to be tested. Its radially exterior face is formed with flanges 58 configured to simulate the flanges of a vehicle on which the tested tire might be utilized. Its radially interior race is shaped in a cylindrical configuration adapted to receive the taper sleeve 54. The taper sleeve has a radially exterior face of a cylindrical configuration and of a size for receiving the interior face of the rim. The radially interior face of the taper sleeve is of a frustroconical configuration, larger at the bottom than at the top for being received on the test spindle 14. Its upper extent includes locking ramps 60 extending radially inwardly with inclined upper surfaces 62 matable with corresponding components of the machine for holding the rim assembly 16 and test tire 18 in place during the testing operation as will be described more fully hereinafter. Four such concentrically shaped locking ramps are employed in accordance with the preferred embodiment of the present invention. The locking ramps are separated by four concentric spaces 64.

The radially interior face of the taper sleeve 54 includes one or more keyways 66 to receive a drive key or keys 68 located in an index spindle 14 at the index assembly 20 as well as another drive key or keys 70 in the test spindle 14 at the test spindle assembly 12. The keyways and drive keys insure concurrent rotation of the rim and test tire with its supporting spindle and preclude any independent rotation therebetween.

Upwardly projecting from the upper surface of the rim 56 are a pair of gripping pins 74 and a pair of inflation risers 76. The pins and risers are symetrically spaced adjacent the periphery of the rim ninety degrees with respect to each other. Each gripping pin includes an enlarged head 78 at its upper end, elevated from the upper surface of the rim, for functioning in the movement of the rim assembly and test tire between stations and assemblies of the machine as will be described more fully hereinafter. Each gripping pin also includes threads at its lower end for releasably coupling with the rim. The inflation risers 76 are adapted to allow for the flow of air from exterior of the rim, through the inflator assembly 52, through a fluid flow path extending through the rim, and to the tire for effecting its inflation prior to its movement for testing.

The rim assembly 16 is formed to accept upwardly projecting bolts 80 extending through flanges at the lower periphery of the taper sleeve and into the rim for separably coupling the rim and taper sleeve. The bolts allow a common taper sleeve to be used with any one of a plurality of rims of differing sizes as a function of the size of the tire or tires to be tested.

Each inflation riser 76 is in the shape of an inverted cup with apertured flanges at the periphery of its lower end. Bolts 82 extend through the apertures for securing the inflation risers to the rim. O-rings 84, partially recessed within a lower face of the inflation risers, contact an adjacent portion of the rim to pneumatically secure together these elements of the machine.

Located within the inflation riser 76 is a poppet type check valve which permits the passage of a large volume of air to inflate the test tire to the desired pressure. This valve will act to seal air within the tire once the inflator is removed and during the testing process. This valve consists of a poppet or plunger 88 which slides axially along a fixed slide pin 86. A coil spring 90 tends to urge the poppet upwardly toward an air receiving aperture 92 in the upper surface of the inflation riser 76. An O-ring 106, attached to the top surface of the plunger 88, functions to close off the aperture 92 thus creating a pneumatic seal. A roll pin 94 retains the spring 90, plunger 88, and slide pin 86 as an assembly. The plunger 88 has an elongated slot 96 machined through its side to mate with the roll pin 94 and still slide axially up and down along the slide pin 86. The lower end of the slide pin 86 is formed with threads so as it may be screwed down into the threaded sides 98 of a recess 100 in the rim. The lower end of the spring 90 is supported on a shoulder 104 machined on the slide pin 86. The spring 90 extends upwardly therefrom where it contacts and urges the plunger 88 upwardly to seal the aperture 92.

When the air inflator of the inflator assembly 52 is moved into operative contact with the plunger 88 its downwardly extending portion will extend through the aperture to contact and depress the plunger, compressing the spring 90, whereby air may be introduced through the chamber and into the tire. The fluid flow path includes the aperture in the upper face of the inflation riser, the vertical extent of the inflation riser around the plunger and slide pin, parallel vertical holes 108 in the rim and an axial horizontal hole 110 in the rim coupling the vertical holes to the interior of the tire. Removal of the air inflator will allow the spring to return to its original extended position sealing the compressed air in the rim and tire.

Figure 3:
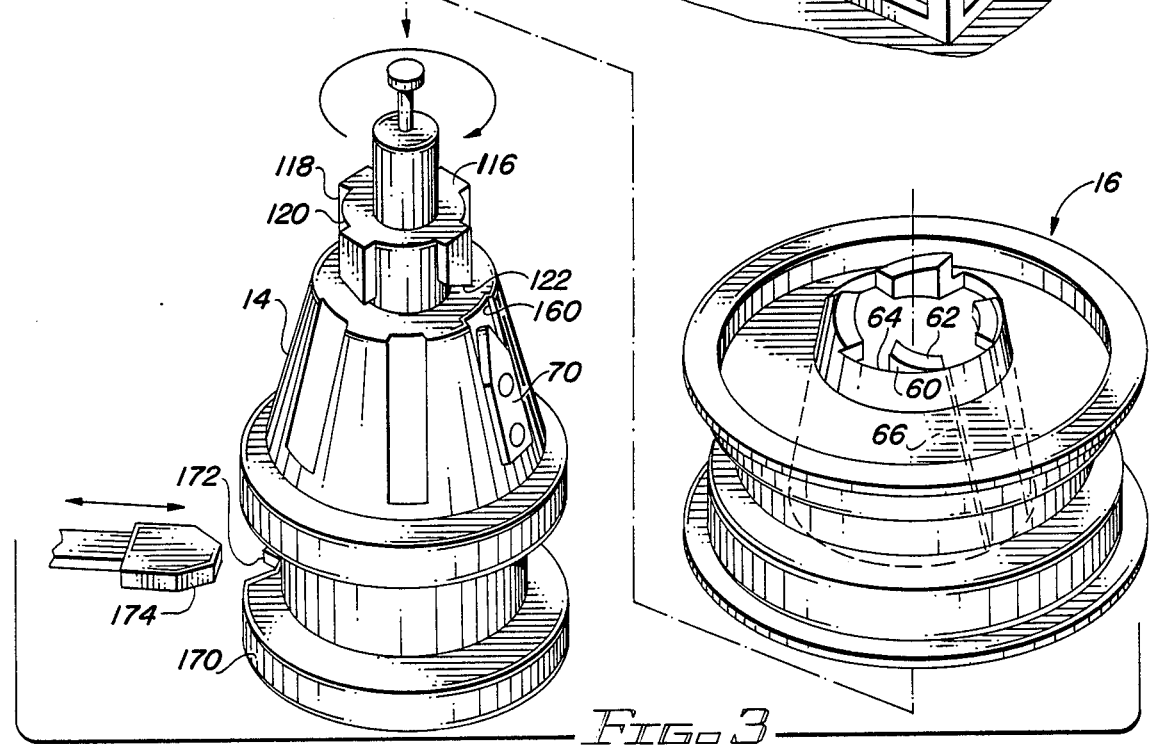
FIG. 3 is an exploded perspective illustration of the test spindle assembly and the rim assembly including the V-locator in its retracted position but excluding the gripping pins and inflation risers to more clearly show the locking ramps.
Figure 6B:
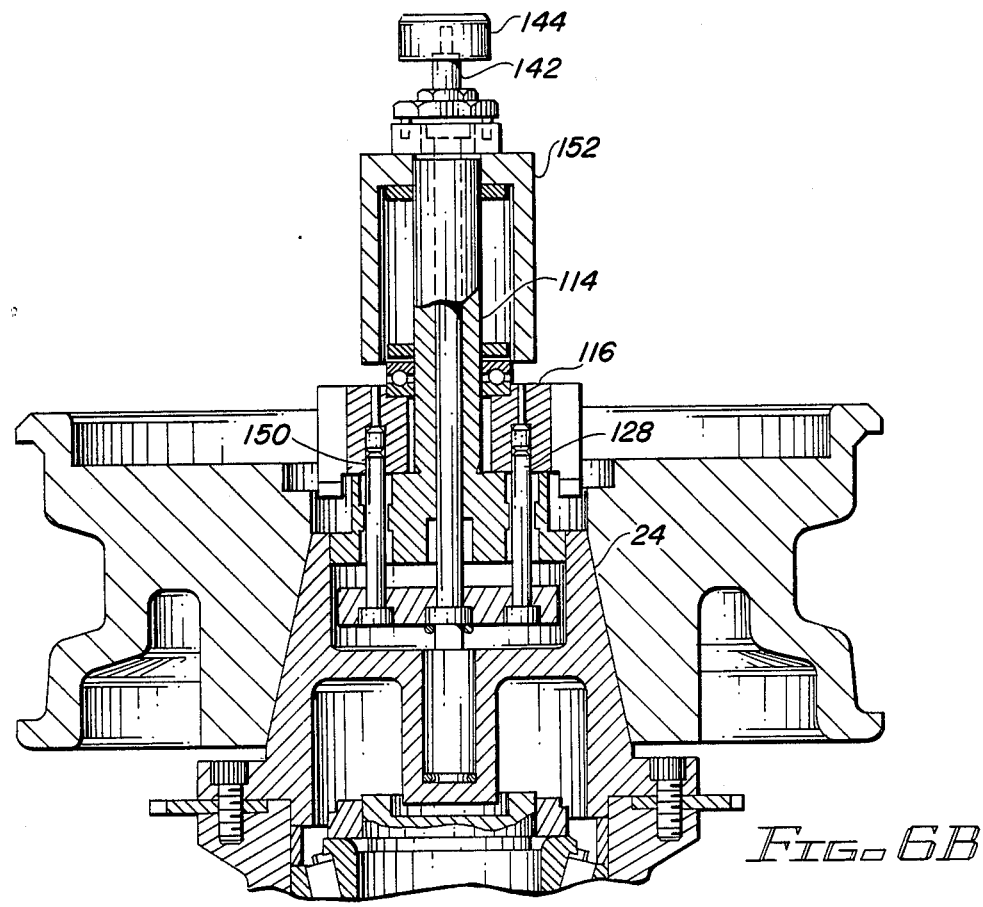
FIG. 6b is a side sectional view of the rim assembly and the upper portion of the test spindle assembly.
Figure 6A:
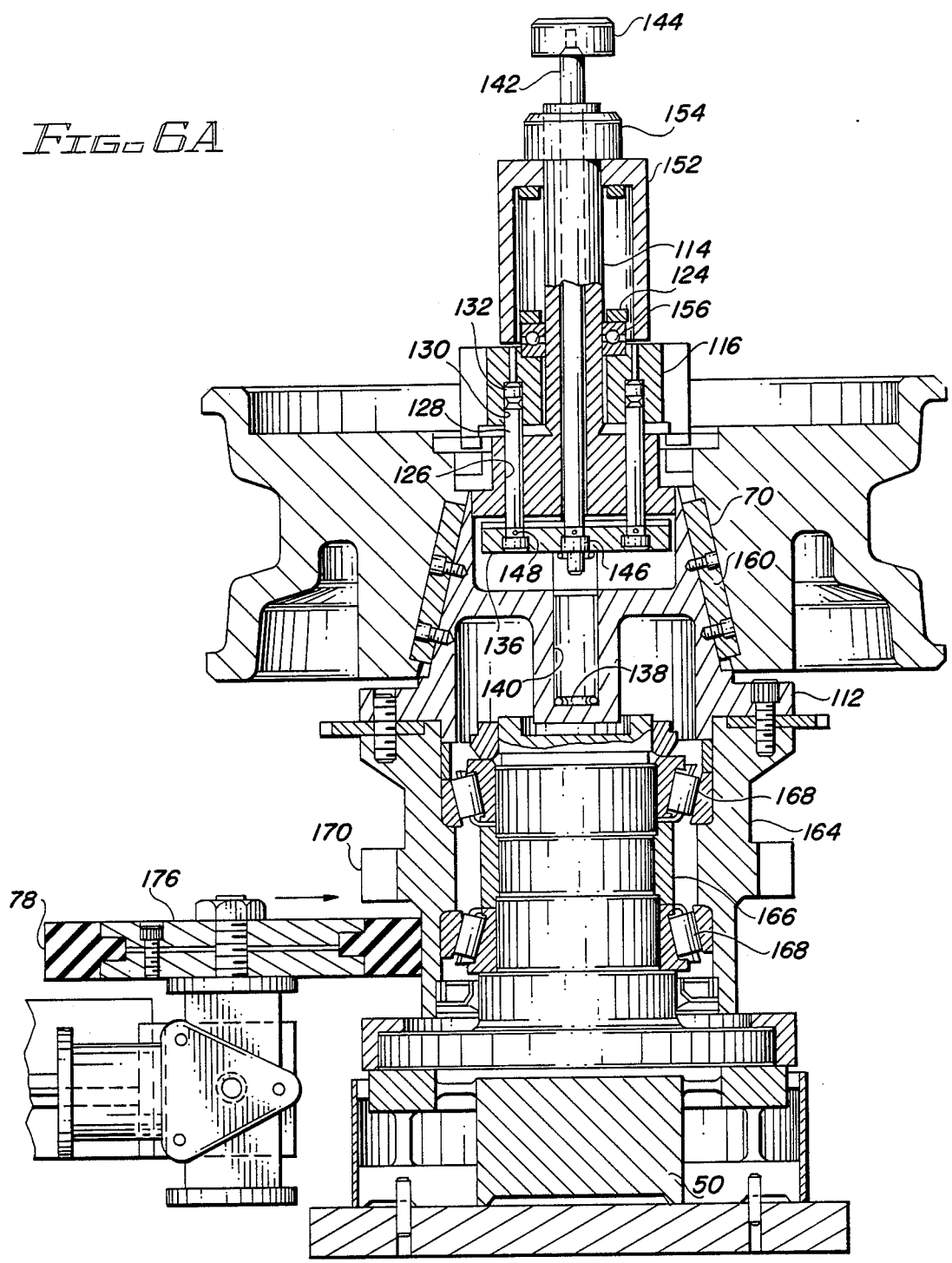
FIG. 6a is a front sectional view of the rim assembly and test spindle assembly.

As shown particularly in FIGS. 6a and 6b, the main element of the spindle assembly 12 is the rotatable taper body 112 which is configured to receive the test tire through its supporting rim assembly. The exterior peripheral face of the taper body is frustroconical, tapering upwardly to conform with the interior face of the taper sleeve. The upper end of the taper body fixedly supports the enlarged lower end of an elongated chuck body 114 for rotation therewith. At its axially central extent, the chuck body rotationally supports a locking rotor 116 having radially outwardly directed locking ramps 118 formed with circumferential spaces 120 therebetween. The lower surfaces of the locking ramps are formed with inclined surfaces 122 which contact, and cooperate with, the inclined surfaces 62 of the locking ramps 60 of the rim assembly 16 to effect a coupling action. Note FIG. 3. The inclined ramps and spaces of both the spindle assembly and rim assembly are configured to cooperate whereby clockwise rotation of the rotor as seen in FIG. 3 in association with downward pressure on the rotor by the die spring 124 will lock the lower surfaces of its ramps over the upper surfaces of the inclined ramps of the rim to effect the locking of the rim assembly and tire to the spindle assembly.

Apertures 126 extend through a flange at the lower end of the chuck body 114 for receiving a pair of lock pins 128. The upper ends of the lock pins extend into aligned, upwardly extending recesses 130 in the rotor. Plugs 132 are preferably located within the recesses of the rotor for purposes of proper spacing. When the lock pins are extended into the recesses of the rotor, they will preclude rotation of the rotor with respect to the chuck body 114, taper body 112, and the remainder of the spindle assembly.

The lower ends of the lock pins are formed with enlargements which are received in recesses of a T-bar 136 upwardly biased by a coil spring 138. Positioning of the spring is effected by placement of its lower end in an axial recess 140 of the taper body 112. Axial movement of the T-bar and lock pins downwardly is effected by the application and removal of an external force upon a plunger 142.

The plunger is an axially located, elongated, cylindrical member positioned with a button 144 at its upper end for receiving an external force and with a collar 146 adjacent to its lower end within a central recess of the T-bar. Pins 148 couple the lower ends of the lock pins and plunger to the T-bar. Thus, a downward force on the button and plunger will move the T-bar downwardly to compress the coil spring 138 while driving the lock pins downwardly out of locking engagement with the rotor. Relief of the external pressure on the button allows for the coil spring to drive the T-bar, pins and plunger upwardly, either to position the upper ends of the pins within the recesses of the rotor, or into alternate recesses 150 in the lower surface of the rotor if the rotor has been rotated.

An inverted cup-shaped cover 152 is positioned with its central aperture located to receive an upper extent of the chuck body. Its upward movement is limited by a nut 154 threadingly received on the upper end of the chuck body. Its downward movement is limited by a die spring 124, the upper end of which bears against the cover and the lower end of which bears against the rotor through a thrust bearing assembly 156. The die spring 124 also functions to urge the rotor and its locking ramps into contact with the locking ramps of the rim after the lock pins have been retracted and the rotor has been rotated into its locking orientation. This unlocking motion of the rotor with respect to the taper body will allow rotation therebetween to both axially and rotationally engage the matable locking ramps.

The upwardly tapering exterior face of the taper body 112 includes keyways 160, at least one of which is provided with a drive key 70 extending radially outwardly of the surface of the keyway to allow coupling with an aligned keyway 66 in the rim assembly to thereby preclude rotation of the rim with respect to the spindle during operation and use. The spindle assembly 12 also includes a spindle hub 164 bolted to the lower surface of the taper body for rotation therewith. The spindle hub has located internal thereof a tube spacer 166 with roller bearings 168 to allow for the rotation of the spindle hub and taper body with respect to the fixed tube spacer. The spindle hub includes a flange 170 having an axially extending V-shaped notch 172 adapted to receive a spindle lock or V-locator 174 for effecting the proper predetermined rotational positioning of the spindle, its locking ramps, as well as the rim and tire.

A drive wheel 176 with an elastomeric surface 178 is located in driving contact with the lower portion of the spindle hub to effect any necessary minor rotation of the spindle hub and consequently the tire until the spindle lock or V-locator 174 is received within the notch 172 and effects proper rotational positioning of the spindle assembly. The tube spacer 166 clips onto a fixed shaft and is fit to obtain a proper preload for the tapered roller bearings 168. The entire spindle assembly mounts on top of the transducer 50 for detecting the vibrations caused by structural nonuniformities within the test tire during rotation.

Figure 2A:
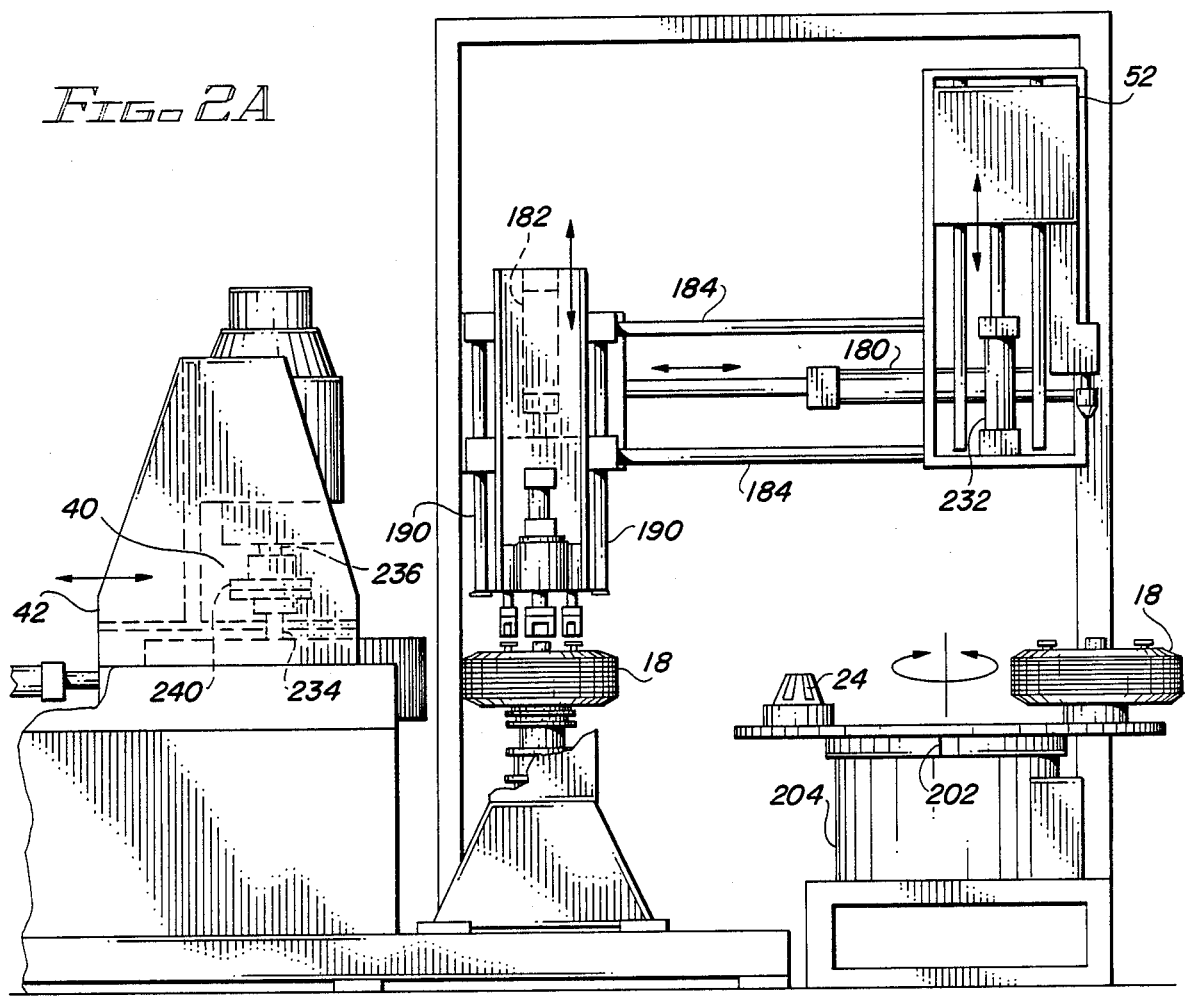
FIG. 2a is a front elevational view of the tire uniformity machine shown in FIG. 1.

The loader robot assembly 36 serves two functions. It moves the tire back and forth between the index assembly 20 and the test spindle assembly 12. It also functions to provide the forces needed to couple and uncouple the rim assembly 16 with the spindle assembly 12. These forces are provided by mechanisms located in a tire loader and power wrench subassembly 38 mounted for vertical reciprocation between a lower orientation for gripping and releasing a rim assembly 16 supporting a tire and an upper orientation for horizontal movement. This subassembly is also mounted for horizontal reciprocation between a first position above the index spindle at the index station 34 and a second position above the test spindle assembly 12. As seen in FIGS. 1 and 2a, horizontal pneumatic cylinder 180 effects the motion of the subassembly from between the spindles while a vertical pneumatic cylinder 182 raises and lowers the tire loader and power wrench subassembly between a lower operational position and a raised moving position for movement between assemblies.

The loader robot assembly includes an array of vertical and horizontal supports extending from adjacent to the test spindle and the index spindle at the indexing station. Horizontal guide rails 184 are supported for the movement of the tire loader and power wrench subassembly. This subassembly is provided with rollers for its smooth horizontal movement and is also coupled with a horizontal pneumatic cylinder 180 for movement of the subassembly between its end positions. Limit switches, conventional in their design and use, are also provided adjacent the end positions to inactivate the horizontal pneumatic cylinder when the end positions are reached by the subassembly. The tire loader and power wrench subassembly includes the power wrench 186, the gripper fingers 188 and their activating solenoids, rollers to guide its motion on vertical guide rails 190, and limit switches, also conventional, to inactivate a vertical pneumatic cylinder 182 when the subassembly reaches its intended raised or lowered position.

The gripper fingers 188 include a pair of mating blocks 192 and 194 movable between opened exterior positions and closed interior positions equidistant from the centerline of the gripper pins. In their closed interior positions, recesses 196 within the gripper finger blocks receive and support the enlarged heads 78 of the gripper pins 74 to effect support of the gripper pins, rim and tire for movement between the test spindle and the index spindle at the indexing station. In their exterior positions the gripper finger blocks may be raised and lowered independent of the gripper pins whereby the test tire may rotate independently of the gripper fingers. Appropriate and conventional solenoids, not shown, may be provided within the gripper blocks to allow for the gripping and releasing of a rim by the gripper pins.

Moving upwardly and downwardly with the gripper blocks is the power wrench 186. In addition to the movement in a vertical plane, the power wrench is also provided with a rotary actuator 198 to provide a rotational motion to the power wrench about its axis. This axis is also the axis of the rim and tire as well as the test spindle. The rotary actuator effects the rotation of the power wrench when in its lower position when its fingers are located within the spaces 120 between the locking ramps 118 of the locking rotor 116. The vertical edges of the wrench will contact the vertical edges of the locking ramps of the locking rotor in the spaces therebetween. Actuation of the rotary actuator 198 and power wrench 186 in a clockwise direction for forty-five degrees will cause a wedging action of the locking ramps 118 of the locking rotor into sliding contact with the mating surfaces 62 of locking ramps 60 of the rim assembly 16 to couple their surfaces in a secure frictional contact through the axial force imparted by the die spring 124. After the locking has been completed, the gripper fingers 188 will be energized to release the gripping pins 74 and to rise to a position out of contact with the rim and spindle so that the test tire may be rotated for the testing procedure. In addition, the central portion of the power wrench 186, due to its downward movement, contacts the button 144 of the plunger to provide an axial motion sufficient to disengage the lock pins 128 from the recesses 130 of the rotor whereby desired rotation of the rotor may then be effected.

When the testing procedure is complete, the subassembly will again be lowered whereby the gripper fingers 188 grasp the gripping pins 74. The locking pins 128 will also be retracted from the additional recesses to allow for the counter-rotation of the locking rotor 116. The power wrench 186 will also contact the locking ramps 118 of the rotor 116 to allow rotation of the locking rotor counterclockwise, a forty-five degree counterclockwise movement, concurrently with the gripping of the gripping pins 74 and the lifting of the rim and tire from the test spindle. Elevation of the subassembly after the counterrotation returns the lock pins 128 from the alternate recesses 150 to the primary recesses 130 in the locking rotor 116. Horizontal motion of the subassembly to a location above the index spindle and the lowering of the subassembly are then followed by the release of the gripping pins 74. The test spindle is again ready for indexing of the tested tire to the operator loading station 32 and the receipt of a subsequent tire to be tested.

The index assembly 20 includes a flat circular table 22 adapted for rotary oscillation of one hundred eighty degrees between an operator loading station 32 and an index station 34. The table is mounted with its axis located on the axis of a supporting shaft 202, the lower end of which is coupled to a indexing motor 30 located within a housing 204. The housing is provided with indexing switches for oscillating the circular table and two upstanding index spindles 24 and 26 one hundred eighty degrees in either direction for moving a test tire between the operator loading station 32 adjacent the operator and the index station 34 beneath the loader robot assembly for movement of the tire and rim assembly to the test spindle by the loader robot assembly and for then receiving the tested tire from the test spindle by the loader robot assembly. The index spindles with the tested tire may then be rotated back one hundred eighty degrees to the operator loading station where the tested tire may be removed by an operator for disassembling the tire from the rim and whereat the next tire to be tested, along with its supporting rim assembly, may be placed on the index spindle at the loading station.

Figure 9:
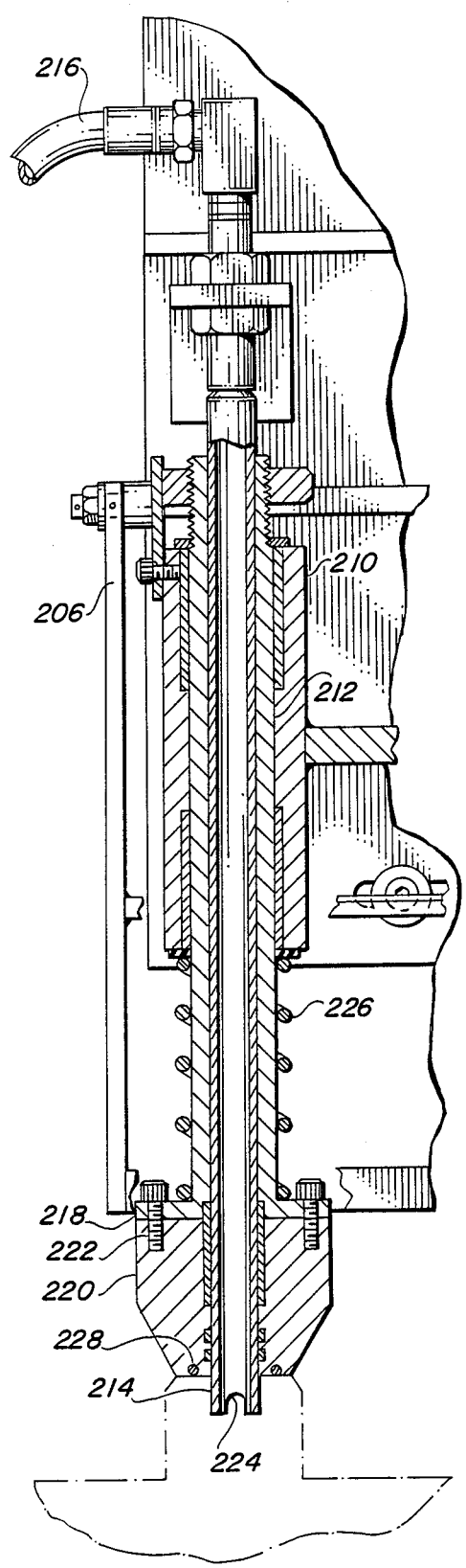
FIG. 9 is a sectional view of a portion of the inflator assembly.
Figure 7:
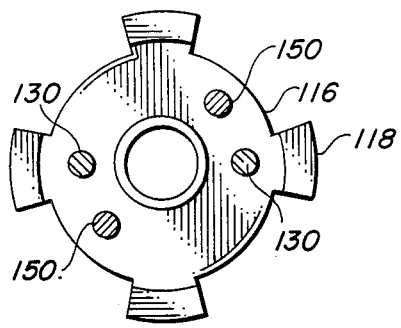
FIG. 7 is a plan view of the locking rotor.
Figure 10:
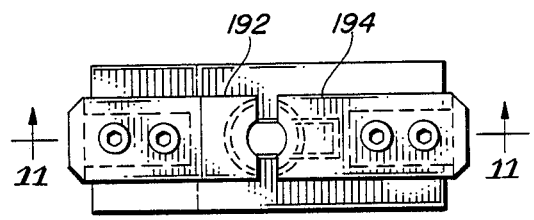
FIG. 10 is a plan view of the gripper fingers.
Figure 11:
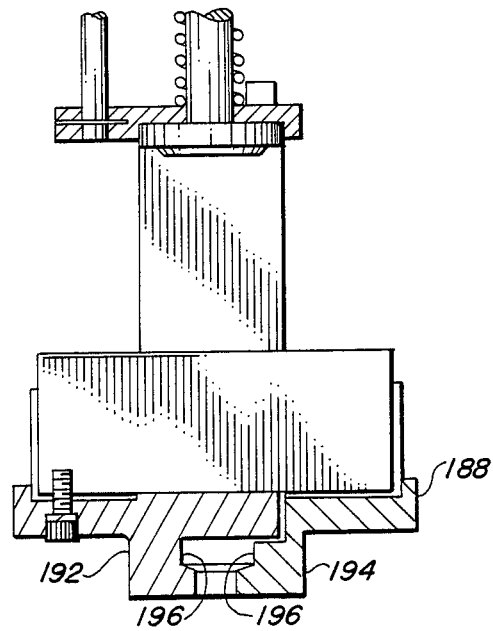
FIG. 11 is a sectional view of the gripper fingers taken along line 11—11 of FIG. 10.
Figure 8:
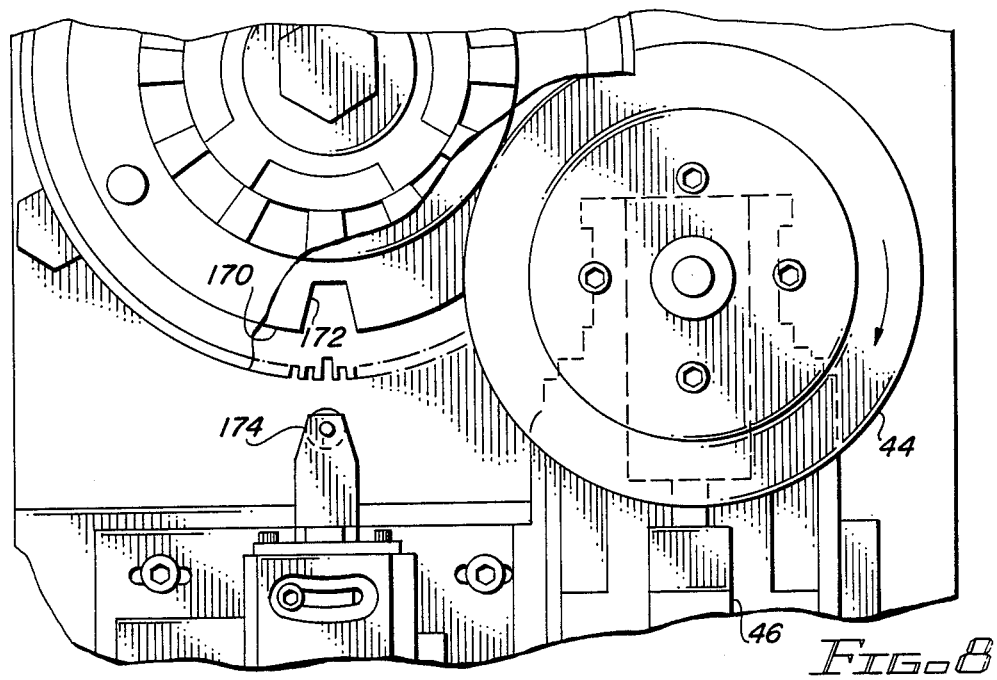
FIG. 8 is a plan view of the V-locator, test spindle assembly and roadwheel.
Figure 12:
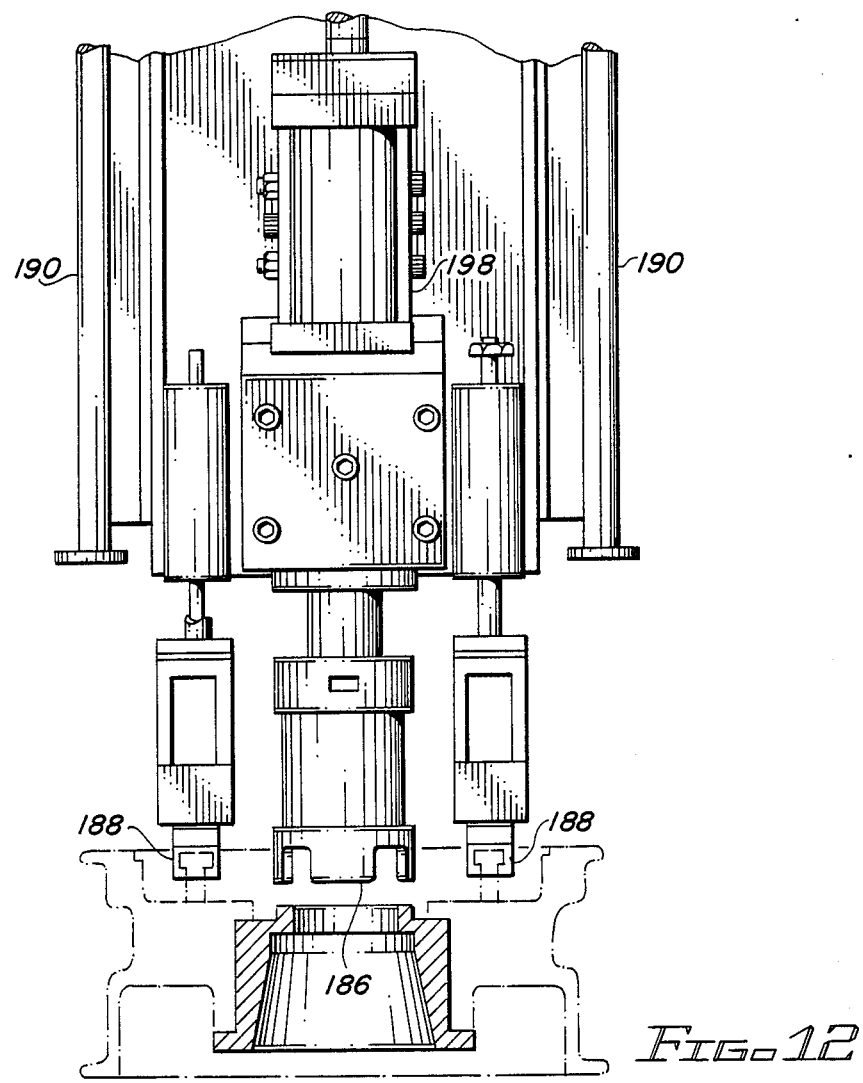
FIG. 12 is a side elevational view of the tire loader and power wrench subassembly and locking rotor with the rim shown in a phantom illustration.

Located above the index spindle at the operator loading station is the automatic tire inflator assembly 52. Note FIGS. 1 and 9. The tire inflator assembly is mounted on a head bracket 206 for vertical reciprocation on guide rails 208 toward and away from the spindle and tire to be inflated at the operator loading station. The tire inflator assembly includes two similarly configured inflating members mounted through cylinders 210 to the head bracket 206 for concurrent vertical reciprocation therewith.

Within the central bore of each cylinder is a shaft 212 having a central bore for receiving an air tube 214. Each air tube is coupled through flexible tubes 216 at its upper end with a source, not shown, of air or other appropriate aeroform fluid under pressure. The lower end of each shaft 212 is provided with a flange 218 to support an inflator head 220 through bolts 222. The lower end of each shaft is provided with semicircular cutouts 224 by which compressed air may flow from the source, through the air tube by way of the inflation risers and channels into the tire to be tested. A coil spring 226 is located between the upper surface of the flange and the lower edge of the cylinder 210 whereby downward motion of the tire inflator into contact with the inflation riser may cause the air tube to rise with respect to the cylinder and head bracket when the downward motion of the head bracket causes the air tube to make a tight fit with the inflation riser. O-rings 228 recessed within the lower face of the inflator head effect a secure pneumatic coupling of the tire inflator with the inflation riser. Upward motion of the head bracket following inflation will allow for the expansion of the coil spring and return of the inflation head and flanged shaft in anticipation of the next inflation cycle. The vertical movement of the inflator assembly is effected by a vertical pneumatic cylinder 232 with conventional limit switches to deenergize the pneumatic cylinder when the air tubes arrive at their proper raised or lowered positions.

With reference to FIGS. 1, 2b, 2d, 2e and 8, the main component element of the roadwheel assembly 42 is the roadwheel 44 with its exterior cylindrical surface rigidly formed of a precision aluminum mounted on radially extending support struts. The roadwheel has a spindle 234 at the interior ends of its struts. The spindle is fixedly mounted on a shaft rotatable about a vertical axis parallel with and offset from the axis of the test spindle and test tire. Bearing assemblies are mounted at opposite ends of the spindle proximate the ends of the hub. The spindle is coupled to the drive shaft 236 of a DC motor 48 mounted coaxially with the spindle. An elastomeric coupling 240 secures the drive shaft of the motor with the roadwheel for the smooth application and relief of power.

Figure 2B:
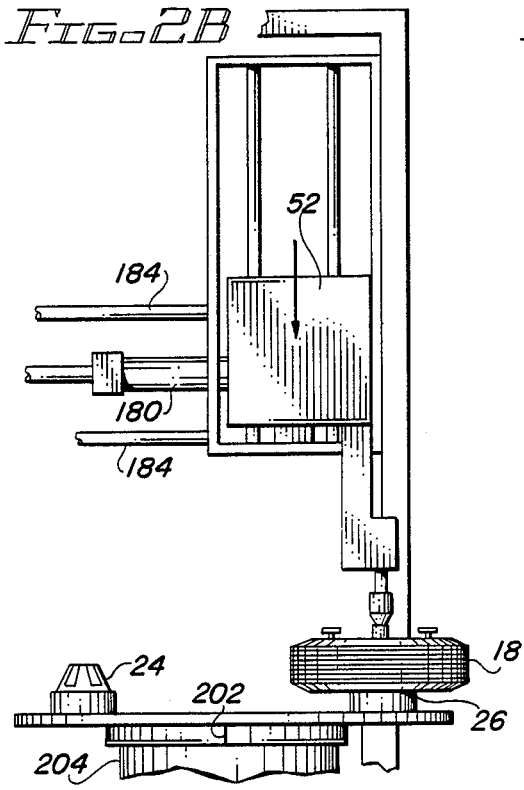
FIG. 2b is a partial front elevational view of the machine shown in FIG. 2a but with the inflator assembly in its lowered position.
Figure 2C:
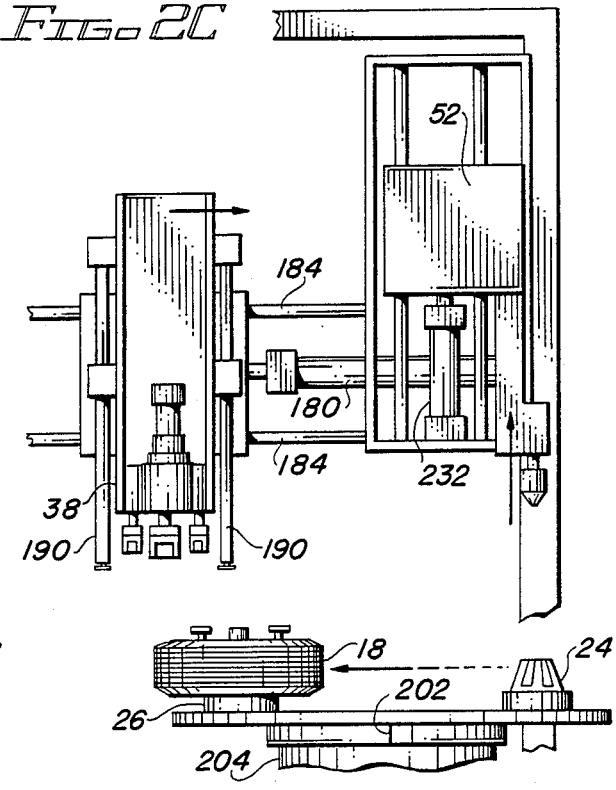
FIG. 2c is a partial front elevational view similar to that shown in FIG. 2b but with the inflator assembly raised and the tire loader and power wrench subassembly preparing for being lowered.
Figure 4:
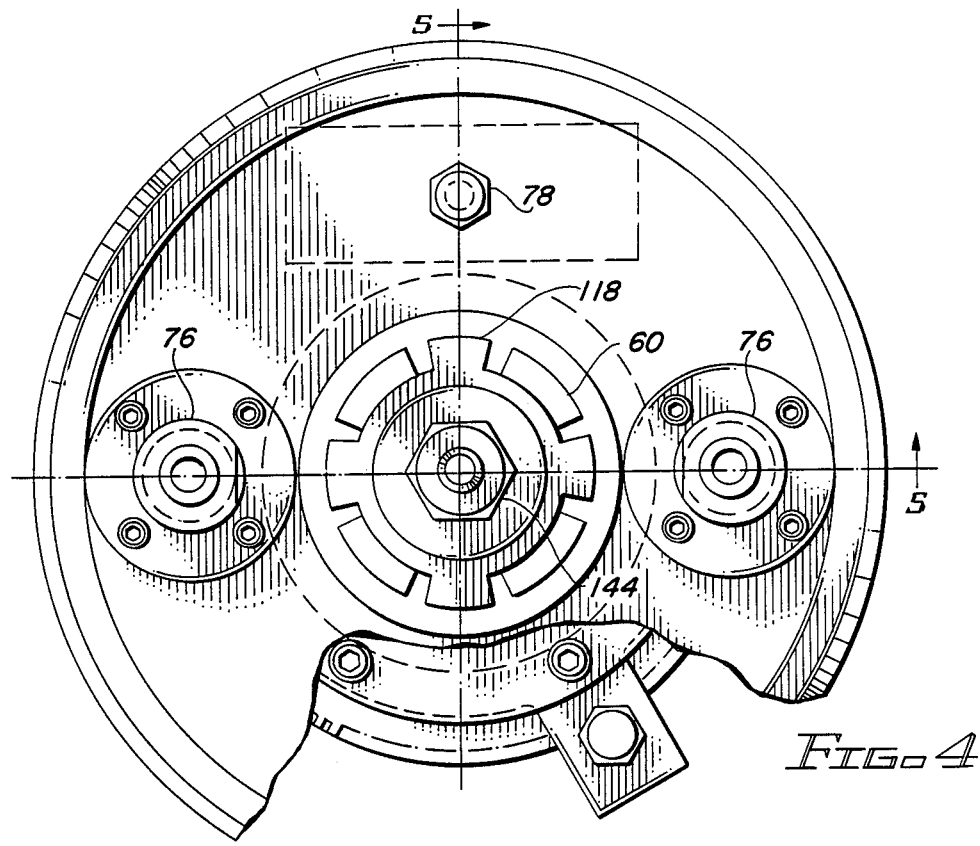
FIG. 4 is a plan view of the test spindle assembly and rim assembly with parts broken away to show certain internal constructions.

The roadwheel and motor are mounted in a carriage 242 mounted on guide rails through appropriate bearing assemblies. Stop plates and limit switches are located at opposite ends of one of the guide rails to limit the path of movement of the carriage, motor and roadwheel between a retracted position with the roadwheel out of contact with the test tire, as shown in FIGS. 2a and 2b, and an operative advance position wherein the roadwheel will drivingly contact the test tire on the test spindle. Note FIGS. 1 and 2e. A hydraulic cylinder 46 is coupled to the carriage 242 for retracting and advancing the roadwheel. The hydraulic cylinder is inactivated by conventional limit switches which determine the carriage arriving at the proper retracted and advanced positions.

In operation and use, the tire uniformity machine of the present invention may function to carry out a method of handling test tires and testing them for uniformity in an essentially automatic mode of operation. The sequence of events may be followed by referring to FIGS. 2a through 2e. The operator begins by mounting a tire 18 on a rim 56 and placing the uninflated tire with its supporting rim on the index spindle 26 at the operator loading station 32 of the index table assembly 20. The location of the key or keys 68 of the index spindle and the keyway or keyways 66 of the rim insure proper orientation of the gripper pins 74, inflation risers 76, and locking ramps 60 and 118 as required throughout the sequencing of the machine and its method. If desired, the spindles at the index assembly 20 may be provided with locking mechanisms, including locking ramps, a locking rotor and the like, of the type employed at the test spindle assembly 12, in order to provide for more accurate handling of the test tire.

The depression of a conventional start pedal, not shown, associated with an operator console will initiate the automatic operation of the machine with timing of the various solenoids and pneumatic cylinders controlled by limit switches energized and de-energized by the functioning components of the machine. With the start pedal engaged, the pneumatic cylinder 232 will drive down the inflator assembly 52 and position the air tubes 214 in operative engagement with the inflation risers 76 of the rim 56 allowing the flow of air through the rim into the tire. When the appropriate pressure has been provided, the inflator assembly will rise with the plunger of the inflation risers acting as a valve to seal the rim and tire with air of a predetermined pressure. The pneumatic cylinder will stop its upward or downward motions upon contacting associated limit switches with which it is coupled.

Upon the inflator assembly reaching its uppermost position, a limit switch will stop its upward motion and signal the index table to rotate 180 degrees thereby tripping a limit switch which will energize the automatic tire loader and power wrench subassembly 38 whereby a vertical pneumatic cylinder 182 of the subassembly will drive the subassembly downward toward a test tire previously fed to the index station. Upon reaching its appropriate lowermost position, the downward motion of the subassembly will stop with its limit switch having been contacted. This action will close the gripper fingers 188 to grasp the gripper pins 74 through solenoids in the blocks of the gripper fingers. The gripper fingers having been closed, the vertical pneumatic cylinder 182 will raise the subassembly until it contacts a limit switch to stop the upward movement. At this point, the subassembly will move horizontally through the energization of the horizontal pneumatic cylinder 180 until a limit switch is contacted. The subassembly and rim with its supporting tire is thus positioned above the test spindle assembly 12. At this point, the vertical pneumatic cylinder 182 is energized to lower the subsassembly and position the rim and supported test tire on the test spindle. Upon reaching the lower position, a limit switch is contacted by the subassembly to rotate the rotary actuator 198 for a forty-five degree clockwise rotation since the subassembly has lowered the locking pins 128 to allow rotation of the locking rotor 116. At this time, the limit switch associated with the rotary actuator will be contacted to open the gripper fingers and also retract the V-locator 174 whose limit switches will energize the vertical cylinder 182 to raise the subassembly 38 allowing the locking pins 128 to enter the alternate recesses for locking the tire and rim with the locking rotor and the locking rotor with the lower mechanisms of the test spindle assembly. At this time, hydraulic cylinder 46 will move the roadwheel 44 through its carriage into driving contact with the test tire.

The test sequence on the test tire will then be carried out with the roadwheel 44 rotating in contact with the test tire 18 and the transducer 50 sensing the vibrations of the test spindle. During the testing sequence, the roadwheel is rotated at varying speeds and loads representative of those which occur on automobiles in service and measure the vibratory axle forces which cause vibrations and acoustical disturbances in the automobiles.

With the test sequence having been completed, the test spindle will be rotated automatically until the V-locator 174 moves into its slot 172 on the taper block and the test spindle is properly located. The automatic tire loader and power wrench subassembly 38 of the loader robot assembly 36 will then be lowered automatically and its gripper fingers 188 closed over the gripper pins 74 as well as the locking pins 128 retracted from the alternate recesses 150 of the locking rotor 116. The above-described sequence will then be automatically operated in reverse until the tested tire arrives at the operator loading station for being manually removed from the index spindle and the tire deflated and disassembled from its rim.

While the machine is functioning to test a tire, the operator may mount an additional tire on an additional rim and place it on the index spindle at the operator loading station. In this manner, when the tested tire is rotated from the indexing station to the operator loading station, the next tire to be tested will be moved to the index station for the next test sequence.

The present disclosure includes that information contained in the appended claims as well as that in the foregoing description. Although the invention has been described in its preferred forms or embodiments with a certain degree of particularity, it is understood that the present disclosure of the preferred form has been made only by way of example and that numerous changes in the details of construction, fabrication and use, including the combination and arrangement of parts and method steps, may be restored to without departing from the spirit and scope of the invention.

What is claimed is:

1. A machine for testing the uniformity of test tires comprising in combination:
    a test spindle rotatable about its axis and configured to receive a rim supporting a test tire;
    an index table rotatable about an axis parallel with, but offset from, the axis of said test spindle, said index table having a pair of spaced, upwardly extending index spindles;
    indexing means to rotate said index table about its axis whereby said index spindles may move between an operator loading station remote from said test spindle and an index station in proximity to said test spindle;
    a loader robot adapted to move between a first position at said test spindle and a second position at said index spindle at said index station for transporting therebetween a rim supporting a test tire;
    a roadwheel rotatable about an axis parallel with, but offset from, said axis of said test spindle, means to move said roadwheel between a retracted position out of contact with a test tire supported by said test spindle and an advanced position wherein said roadwheel is in driving contact with a test tire supported by said test spindle;
    motor means to rotate said roadwheel while in its advanced position; and
    transducer means coupled to said test spindle to determine vibrations of the test tire when rotated by said roadwheel as caused by non-uniformities within the test tire.

2. The machine as set forth in claim 1 wherein said index table is circular and said index spindles are located adjacent to its periphery at diametrically opposed locations.

3. The machine as set forth in claim 2 wherein said axes of said test spindle, index table and roadwheel are all parallel with, but offset from, one another and located with a common plane and with said axis of said test spindle located between said axes of said index table and said roadwheel.

4. The machine as set forth in claim 1 wherein said loader robot includes gripper means to grip a rim supporting a test tire.

5. The machine as set forth in claim 4 wherein said loader robot is adapted to move vertically between a lower position whereat said gripper means may grip and release a rim supporting a test tire and a higher position whereat said gripper means may horizontally transport a gripped rim supporting a test tire.

6. The machine as set forth in claim 1 and further including inflation means to inflate a test tire supported by a rim on said index spindle at said operator loading station.

7. The machine as set forth in claim 1 wherein said test spindle includes locking means to lock and unlock thereon a rim supporting a test tire.

8. The machine as set forth in claim 7 and further including means on said loader robot to activate and inactivate said locking means.

9. Apparatus for feeding a test tire mounted on a rim to and from a test station comprising, in combination:
    an indexing assembly including a pair of spaced, upwardly extending index spindles adapted to move between an operator loading station and an index station;

a loader robot assembly adapted to move between a position at the test station and a position adjacent to said index spindle at said index station for transporting therebetween a test tire mounted on a rim;

a roadwheel assembly having a roadwheel rotatable about its axis, means to move said roadwheel between a retracted position out of contact with a test tire at the test station and an advance position wherein said roadwheel is in driving contact with a test tire at the test station;

motor means to rotate said roadwheel while in its advanced position; and transducer means operatively coupled with the test station to determine vibrations of the test tire when rotated by said roadwheel as caused by non-uniformities within the test tire.

10. The apparatus as set forth in claim 9 wherein said indexing assembly includes a circular table rotatable about its axis and wherein said index spindles are located adjacent to the periphery of said table at diametrically opposed locations.

11. The apparatus as set forth in claim 9 wherein said loader robot assembly includes gripper means to grip and release a rim supporting a test tire.

12. The apparatus as set forth in claim 11 wherein said loader robot assembly is adapted to move said gripper means vertically between a lower position whereat said gripper means may grip and release a rim supporting a test tire and a higher position whereat said gripper means may horizontally transport a gripped rim supporting a test tire.

13. The apparatus as set forth in claim 9 and further including an inflator assembly to inflate a test tire supported by a rim on said index spindle at said operator loading station.

14. The apparatus as set forth in claim 9 and further including locking means associated with the test station to lock thereon and unlock a rim supporting a test tire.

15. The apparatus as set forth in claim 14 and further including means on said loader robot assembly to activate and inactivate said locking means.

16. A method for testing the uniformity of test tires comprising the steps of:

providing a test spindle rotatable about its axis and configured to receive a rim supporting a test tire;

providing an index table rotatable about an axis parallel with, but offset from, the axis of said test spindle, said index table having a pair of spaced, upwardly extending index spindles;

providing an indexing means to rotate said index table whereby said index spindles may move from an operator loading station remote from said test spindle to an indexing station in proximity to said test spindle;

moving a rim supporting a test tire from said index spindle at said index station to said test spindle;

providing a roadwheel rotatable about an axis parallel with, but offset from, said axis of said test spindle;

moving said roadwheel from a retracted position out of contact with a test tire on said test spindle to an advance position wherein said roadwheel is in driving contact with a test tire on said test spindle;

rotating said roadwheel while in its advanced position to rotate said rim and its supported test tire; and sensing the vibrations of the test tire when rotated by said roadwheel.

17. The method as set forth in claim 16 wherein said index table in circular and said index spindles are located adjacent to its periphery at diametrically opposed locations and further including the step of rotating said index table to move a rim supporting a test tire on said index spindle at said operator loading station to said indexing station.

18. The method as set forth in claim 16 and further including gripper means to grip a rim supporting a test tire and said step of moving a rim further includes the steps of moving said gripper means vertically to a lower position at said indexing station whereat said gripper means may grip a rim supporting a test tire, moving said gripper means vertically to a higher position, moving a rim supporting a test tire horizontally, moving said gripper means vertically to a lower position at said test station whereat said gripper means may release a rim supporting a test tire.

19. The method as set forth in claim 16 and further including the step of inflating a test tire supported by a rim on said index spindle at said operator loading station.

20. The method as set forth in claim 16 wherein said test spindle includes locking means to lock thereon a rim supporting a test tire and further including means to activate and inactivate said locking means and further including the step of locking the rim supporting a test tire on said test spindle prior to testing.

* * * * *

UNITED STATES PATENT AND TRADEMARK OFFICE
CERTIFICATE OF CORRECTION

PATENT NO. : 4,763,515

DATED : August 16, 1988

INVENTOR(S) : Martin Pielach et al

It is certified that error appears in the above-identified patent and that said Letters Patent is hereby corrected as shown below:

Column 14, line 43, (first occurrence) "with" should read --within--.

Column 16, line 22, "in" should read --is--.

Signed and Sealed this

Thirteenth Day of February, 199

*Attest:*

JEFFREY M. SAMUELS

*Attesting Officer*       *Acting Commissioner of Patents and Trademarks*